United States Patent [19]
Grotheer

[11] 3,920,801
[45] Nov. 18, 1975

[54] METHOD OF PRODUCING CHLORINE DIOXIDE FROM HYDROGEN CHLORIDE

[75] Inventor: Morris P. Grotheer, Lewiston, N.Y.

[73] Assignee: Hooker Chemicals & Plastics Corporation, Niagara Falls, N.Y.

[22] Filed: Apr. 5, 1974

[21] Appl. No.: 458,364

[52] U.S. Cl. ............... 423/477; 423/473; 423/475; 423/487; 423/491; 423/500; 423/504; 423/648
[51] Int. Cl.² ......................................... G01B 11/02
[58] Field of Search .......... 423/477, 473, 475, 500, 423/487, 499, 504, 648

[56] References Cited
UNITED STATES PATENTS

| | | | |
|---|---|---|---|
| 3,199,949 | 8/1965 | Clerbois et al. | 423/473 |
| 3,442,778 | 5/1969 | Westerlund | 423/500 X |
| 3,755,068 | 8/1973 | Rapson | 423/477 X |

OTHER PUBLICATIONS
Jacobson's, "Encyclopedia of Chemical Reactions," Vol. 6, 1956 Ed., p. 277, Reinhold Pub. Corp., New York.

*Primary Examiner*—Edward Stern
*Attorney, Agent, or Firm*—Peter F. Casella

[57] ABSTRACT

This application relates to a process of producing chlorine dioxide which utilizes hydrochloric acid as a feed material. The process may be operated to have substantially only chlorine dioxide and hydrogen as products. The process utilizes an electrolytic cell to produce an alkali metal hydroxide, chlorine and hydrogen from an aqueous solution of alkali metal chlorides. The alkali metal hydroxide and chlorine that are produced are reacted to form an alkali metal hypochlorite, which in turn is converted into an alkali metal chlorate. The chlorate is reacted with hydrochloric acid to produce chlorine dioxide, chlorine and an aqueous solution of alkali metal chloride. The chlorine dioxide is recovered. The chlorine produced may be used in the prior step by reaction with alkali metal hydroxide or may be burned with hydrogen to produce HCl and utilized in the process. The aqueous solution of alkali metal chloride is recycled used as a feed material for the electrolytic cell.

6 Claims, 2 Drawing Figures

METHOD OF PRODUCING CHLORINE DIOXIDE FROM HYDROGEN CHLORIDE

The present invention relates to a process for the production of chlorine dioxide from a hydrochloric acid raw material.

Important from the ecology standpoint, is that the present process produces substantially no by-products. The alkali metal salts that are required in the present process are captive within the system and may be repeatedly reacted and cycled within the system.

There have been other systems proposed which combine electrolytic cells and generators to produce chlorine dioxide. For example U.S. Pat. No. 3,404,952, issued Oct. 8, 1968, to G. O. Westerlund describes such a process and notes several other related processes. However, these processes generally require either alkali metal chloride or chlorine as a feed material or utilize a complicated electrolytic process. Many of the prior art systems produce by-products which are disposed of with difficulty, and in view of the present day concern regarding ecology, highly undesirable.

In order to balance any of the systems, the chemical reactions that make up the system must be controlled. A balanced system is of utmost importance, otherwise the system ceases to be an integrated whole and becomes a series of separate reactions with either a lesser or greater amount of the desired products for use in the subsequent steps or for recycling to a previous step. The present process not only provides an integrated system, but also provides a ready source of materials to quickly adjust pH in any point in the system to either alkaline or acid to maintain a reaction balance. The present system also provides a means of material balance by providing baffle tanks which allow a rather wide variance in the amount of material in circulation through the system without affecting the feed or product flow rates.

The present system is extremely versatile in that it may be utilized to continuously produce chlorine dioxide or the system may be utilized on an "as needed" basis without an elaborate or costly shut-down or start-up procedure. The system has available at various points intermediate products that may be utilized if desired, e.g., chlorine, alkali metal hydroxides and alkali metal chlorates.

For purposes of conciseness and clarity the present invention will frequently be described in terms of sodium salts rather than alkali metal salts, it will be understood that salts of metals other than sodium, e.g., potassium or lithium, function equally well in the present invention.

The present system is especially useful in bleaching operations as a source of bleaching agents. Thus, when utilized in a wood pulp bleaching operation, the present system may supply, on need, chlorine dioxide, chlorine or mixtures thereof over a broad range of ratios. This facilitates a wide choice of bleaching sequences without the problem of storage or overproduction of unneeded materials. Sodium hypochlorite or sodium chlorate are also available from the system and if such are desired additional sodium chloride is required as feed material. The present system can also produce solutions varying in sodium chlorate-sodium chloride content which are useful in other processes of making chlorine dioxide, i.e., the so-called R-2 process described in U.S. Pat. Nos. 2,863,722 issued Dec. 9, 1958 and 2,936,219 issued May 10, 1960 to Dr. W. H. Rapson. These solutions may readily be transported to other locations for use in other installations. Although the versatility of the system is such that a number of products may be produced at various points, a primary function of the system is its use as an integrated whole which requires a hydrochloric acid feed and produces chlorine dioxide with minimal of make-up and by-products.

The process of the present invention involves a series of chemical reactions. The pH conditions under which some of the reactions are carried out is critical to obtain the desired reaction products and yield. It will be noted that the utilization of hydrogen chloride as a feed material and the production of alkali metal hydroxides in the system provides readily available sources of materials for pH adjustment.

The process of the present invention comprises the following steps: an aqueous solution of alkali metal salts containing a major amount of alkali metal chlorides, suitably sodium chloride, is electrolyzed to produce chlorine, the corresponding alkali metal hydroxide solution and hydrogen. The electrolysis process may also produce minor amounts of other alkali metal salts, e.g. chlorates, mixed with the alkali metal hydroxide. The chlorine and alkali metal hydroxide solutions are reacted to form the alkali metal hypochlorite and subsequently the alkali metal chlorate. The alkali metal chlorate is reacted with hydrochloric acid to form chlorine, alkali metal chloride and chlorine dioxide. The chlorine dioxide is recovered and is suitable for use in the bleaching of wood pulp. The chlorine produced in this reaction may also be utilized in bleaching wood pulp, or it may be reacted with hydrogen from the initial electrolysis to form hydrogen chloride, or it may be used in the prior step which reacts an alkali metal hydroxide and chlorine. The alkali metal chloride produced in this reaction is utilized as a feed material in the initial electrolysis step. The process under exactly balanced conditions produces one mole of chlorine and 6 moles of hydrogen as products. The chlorine and hydrogen may be burned to form additional hydrogen chloride for use as feed material.

The following chemical equations reflect the general reactions of the present process. It is contemplated that reactions of the present invention are as follows; however, it is to be understood that the chemical reactions shown are for clarity of understanding and are not limiting the invention to the reaction shown.

1. $6NaCl + 6H_2O \rightarrow 12NaOH + 6Cl_2 + 6H_2$
2. $12NaOH + 6Cl_2 \rightarrow 2NaClO_3 + 10NaCl + 6H_2O$
3. $2NaClO_3 + 4HCl \rightarrow 2ClO_2 + Cl_2 + 2NaCl + 2H_2O$ The balanced equation for the process is

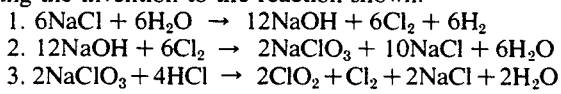

$4HCl + 4H_2O \rightarrow 2ClO_2 + Cl_2 + 6H_2$ The $Cl_2$ produced may then be burned with the $H_2$ to produce HCl which in turn is used as feed stock in the Process:

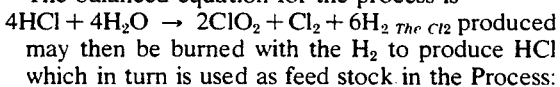

$H_2 + Cl_2 \rightarrow 2HCl$ The over-all balance then is:

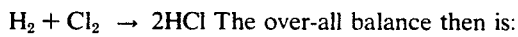

$$2HCl + 4H_2O \rightarrow 2ClO_2 + 5H_2$$

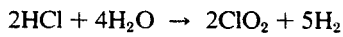

Figure 1:
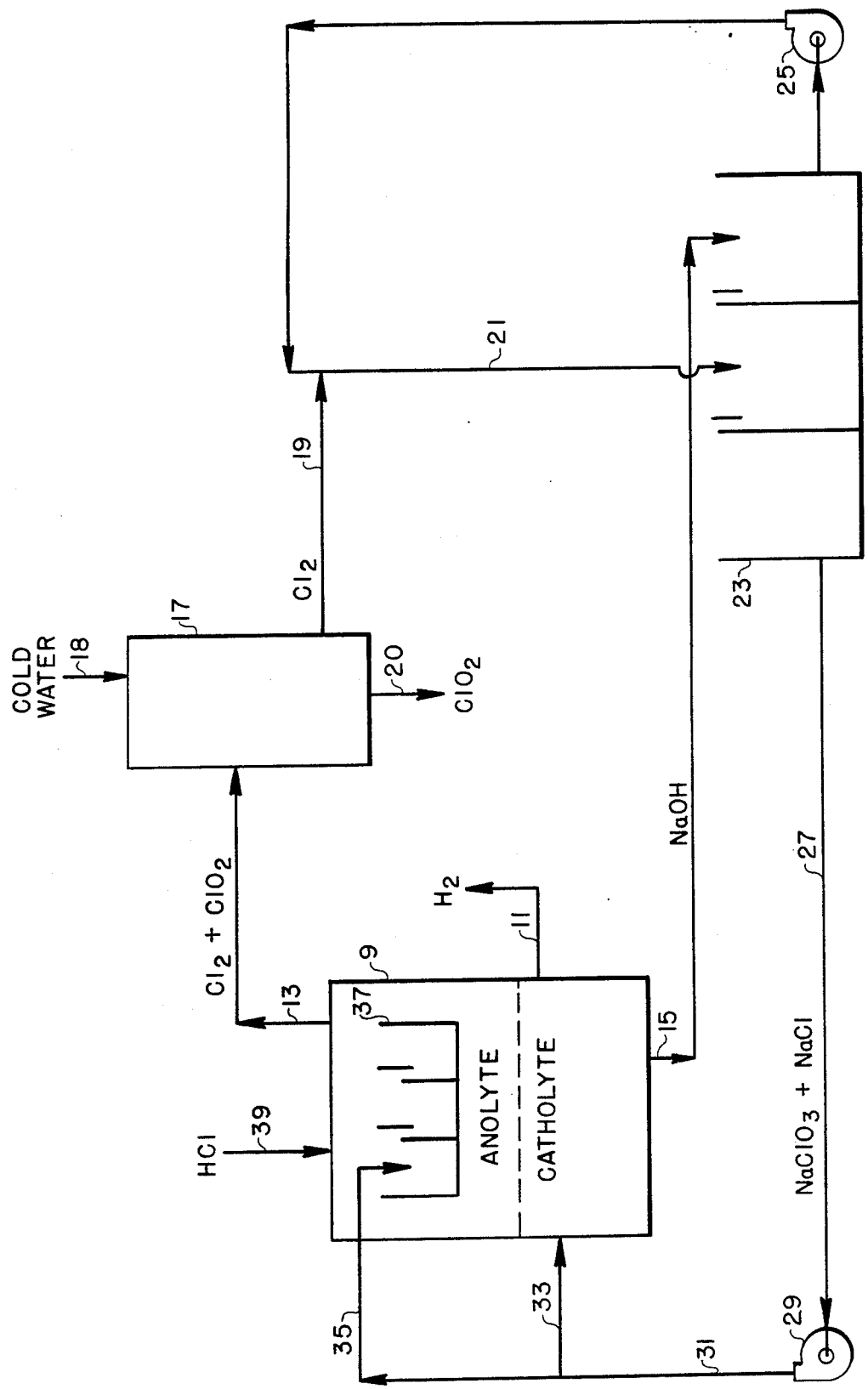
FIG. 1 is a schematic diagram showing the present process in a system wherein the $ClO_2$ produce is produced within the confines of the same electrolytic cell in which the initial electrolysis is conducted.

Looking now to FIG. 1, electrolytic diaphragm cell 9 has an anolyte and a catholyte compartment. Initially, the cell is charged with NaCl solution. The products of cell 9 are $H_2$ which exits from line 11, $Cl_2$ and $ClO_2$ which exit from line 13 and an aqueous solution of NaOH which exits from line 15. The mixture of $Cl_2$ and $ClO_2$ is separated by means of a scrubber 17. Scrubber 17 separates $ClO_2$ and $Cl_2$ by absorbing $ClO_2$ in cold water entering from line 18. The $ClO_2$ is recovered at 20 and is preferably in a water solution and in this form is suitable for use in bleaching wood pulp. The separated $Cl_2$ exits scrubber 17 by line 19 and is combined with a NaOH solution being circulated through line 21. This mixture is fed into a compartmented baffle tank 23, preferably in a second compartment in order that a first compartment can be utilized to store caustic for pump 25 to feed into line 21 and to facilitate a pH adjustment in the tank in order that the sodium hypochlorite formed in line 21 is converted to $NaClO_3$. The product from baffle tank 23 is an aqueous mixture of $NaClO_3$ and NaCl which exits line 27 and is pumped by pump 29 through line 31 back to cell 9. Line 31 is divided into lines 33 and 35. Line 33 feeds into the catholyte section of cell 9. Line 35 feeds into a compartmented baffle tank 37. A supply of HCl 39 is fed into baffle tank 37 to react with the $NaClO_3$ from line 35 to produce $ClO_2$, which in turn exits with $Cl_2$ through line 13. The pH in tank 37 is preferably maintained at less than 1. The overflow from tank 37 produces a pH of about 2.5 in the anolyte compartment of cell 9.

Figure 2:
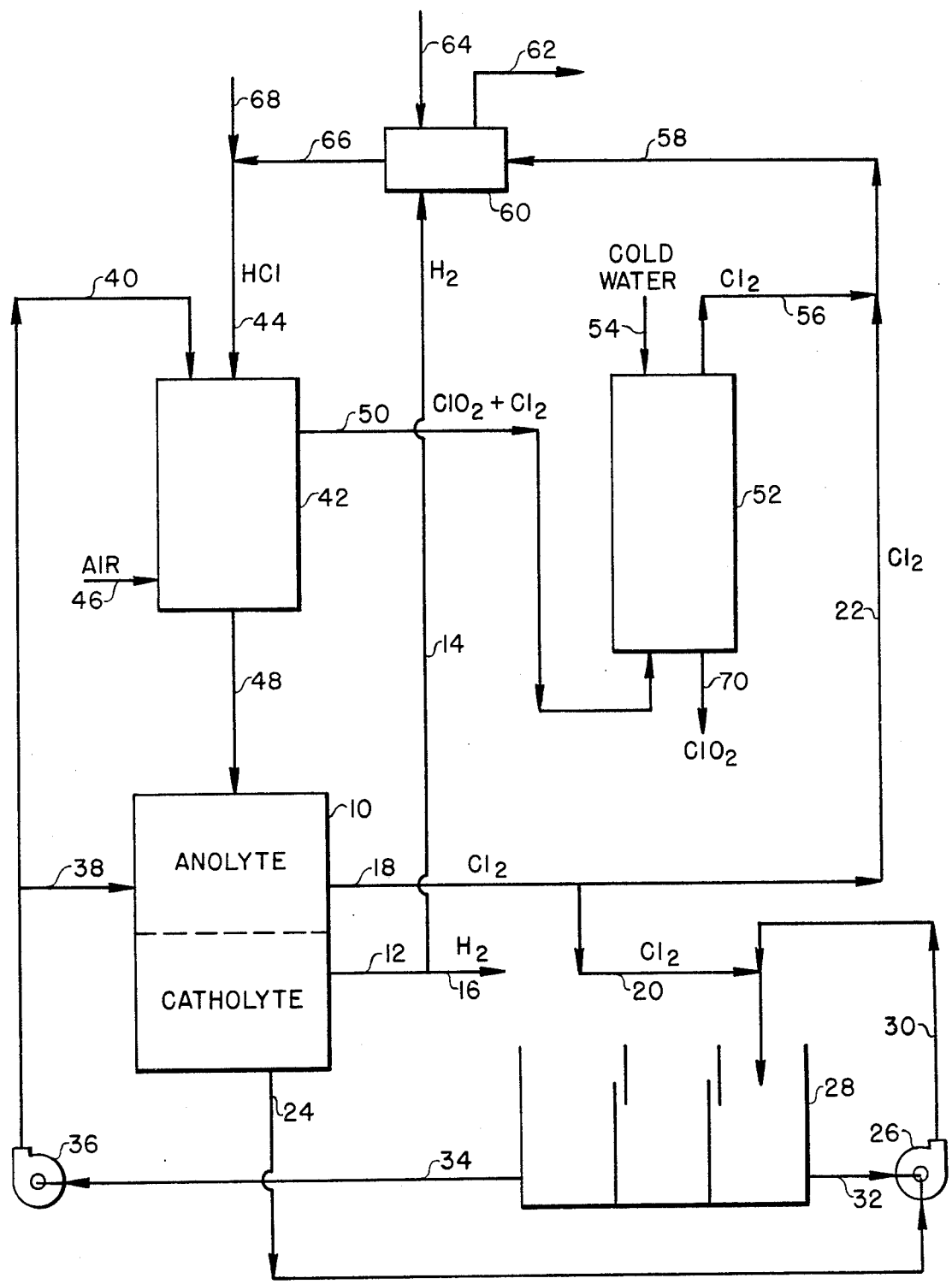
FIG. 2 is a schematic diagram showing the present process in a system wherein the $ClO_2$ product is produced in a unit external of the initial electrolytic cell in which the initial electrolysis is conducted.

Looking now to FIG. 2, an electrolytic diaphragm cell 10 operates at 55,000 amperes at 95 percent efficiency. $H_2$ exits from line 12 at a rate of about 4.3 pounds per hour, with about 34 pounds per hour of entrained $H_2O$. A portion of the $H_2$, about 0.5 pounds per hour is fed through line 14 to burner 60. The remaining portion, suitable for fuel use, is exited from the process through line 16. $Cl_2$ exits cell 10 through line 18 at a rate of about 152.4 pounds per hour, with about 24 pounds per hour of entrained $H_2O$. A portion of the $Cl_2$, about 148.3 pounds per hour is directed through line 20 and is subsequently used to produce NaOCl. The remaining portion of $Cl_2$ is directed through line 22 and subsequently to burner 60. Cell liquor, an aqueous solution of NaOH, containing some $NaClO_3$, NaCl and NaOCl, exits cell 10 through line 24 at a rate of about 167 pounds per hour of NaOH. Line 24 feeds cell liquor through pump 26 which in turn feeds compartmented baffle tank 28 via line 30. Liquor from the first compartment of tank 28 is fed through line 32 to pump 26, which in turn recycles such tank liquor via line 30 to tank 28. The total flow in line 30 is about 10 gallons per minute. The liquors flowing through line 30 are combined with $Cl_2$ from line 20 to form a mixture of reactants that may produce sodium hypochlorite. The second compartment of baffle tank 28 is maintained at a pH of from 6 to 8 and preferably between about 6.8 to 7.2 or as close to neutral as possible to maximize the formation of $NaClO_3$. A $NaClO_3$, NaCl, NaOCl liquor exits tank 28 via line 34 and feeds into pump 36. The solution in line 34 contains about 500 grams per liter $NaClO_3$, about 150 grams per liter NaCl and about 0.2 grams per liter NaOCl and has a flow rate of about 8.82 gallons per minute or about 2,000 liters per hour. A portion of the solution in line 34, about 1750 liters per hour, is directed through line 38 back into cell 10. A second portion is fed through line 40 into $ClO_2$ generator 42. HCl feed material is fed into $ClO_2$ generator 42 through line 44. Air is fed into $ClO_2$ generator 42 through line 46. $ClO_2$ generator 42 may suitably be similar to the apparatus described in U.S. Pat. No. 3,563,702 issued Feb. 16, 1971 to Partridge, et al. $ClO_2$ generator operates on about a 28 percent depletion of $NaClO_3$. The formed NaCl and depleted $NaClO_3$ liquor exits generator 42 through line 48 to cell 10. The $ClO_2$-$Cl_2$ product with some entrained water exits generator 42 through line 50. The flow rate of the $ClO_2$-$Cl_2$-$H_2O$ mixture is about 48.9 pounds $ClO_2$, about 25.8 pounds $Cl_2$ and about 123.6 pounds of $H_2O$ per hour. Line 50 enters $ClO_2$ absorber 52 wherein a flow of cold $H_2O$ from line 54 is utilized to separate $ClO_2$ from $Cl_2$. The $Cl_2$, at a rate of about 13.6 pounds per hour exits from line 56 which connects with line 22 to feed line 58. $Cl_2$ is fed into HCl burner 60 through line 58. $H_2$ from cell 10 is fed into HCl burner 60 through line 14. Air exits from HCl burner 60 through line 62. HCl product from HCl burner 60 through line 66 which in turn connects with line 44. The flow rate of HCl through line 66 is about 56.6 pounds per hour. Preferably the concentration of HCl in line 66 is about 32 percent. Additional HCl at a concentration of about 32 percent, is fed through line 68 which in turn connects with line 44. Preferably the flow of HCl through line 44 is about 69.7 liters per hour. The product exits $ClO_2$ absorber 52 through line 70 and contains about 6 to 8 grams per liter $ClO_2$ and about 1.5 to 2 grams per liter $Cl_2$. This product is useful as such in processes for bleaching wood pulp.

The process of the present invention is particularly suited to situations where HCl is available as a by-product of organic chlorinations. However, $H_2SO_4$ may be reacted with NaCl to produce HCl and $NaHSO_4$. The $NaHSO_4$ product may be reacted with additional NaCl at a higher temperature to produce additional HCl and $Na_2SO_4$. Thus, a $H_2SO_4$ starting material may be utilized if available and $Na_2SO_4$ is desired.

It will be appreciated that the present integrated system has many beneficial aspects when used in connection with other processes and equipment in pollution abatement. The present process may be used to upgrade pollutants. For example the feed material, HCl, may be produced by reacting the products from an additional electrolytic cell that in turn utilizes salt materials recovered from electrostatic precipitators or other pollution preventing means.

What is claimed is:
1. A continuous process for the production of chlorine dioxide which comprises the steps of
 a. electrolyzing an aqueous solution of alkali metal salts containing a major amount of alkali metal chlorides to form
  i. a solution containing alkali metal hydroxides,
  ii. gaseous chlorine,
  iii. gaseous hydrogen,
 b. reacting said chlorine and said solution containing alkali metal hydroxides to form a solution containing alkali metal hypochlorites,
 c. adjusting the pH of said solution containing alkali metal hypochlorites to between 6–8 to convert said solution containing alkali metal hypochlorites to a solution containing alkali metal chlorates and alkali metal chlorides,
 d. recycling a first portion of said solution from step (c) to step (a),
 e. reacting a second portion of said solution from step (c) with hydrogen chloride to form chlorine diox- ide, chlorine and a solution of alkali metal salts,
f. recycling said solution of alkali metal salts from step (e) to step (a),
g. separating the chlorine dioxide and chlorine from step (e) to recover chlorine dioxide.

2. The process of claim 1 wherein the chlorine from step (g) is recycled to step (b).

3. The process of claim 1 wherein step (e) is carried out by adjusting the pH of the solution to between about 6.8 and 7.2.

4. The process of claim 1 wherein chlorine from step (g) is reacted with hydrogen from step (a) to produce hydrogen chloride.

5. The process of claim 4 wherein the said hydrogen chloride is utilized in step (e).

6. The process of claim 1 wherein steps (a), (e) and (f) take place in a single electrolytic cell.

* * * * *